(12) United States Patent
Aepli et al.

(10) Patent No.: US 11,945,143 B2
(45) Date of Patent: Apr. 2, 2024

(54) MATERIAL COMPOSITES

(71) Applicant: EMS-Chemie AG, Domat/Ems (CH)

(72) Inventors: Etienne Aepli, Domat/Ems (CH); Botho Hoffmann, Domat/Ems (CH)

(73) Assignee: EMS-Chemie AG, Domat/Ems (CH)

( * ) Notice: Subject to any disclaimer, the term of this patent is extended or adjusted under 35 U.S.C. 154(b) by 349 days.

(21) Appl. No.: 17/084,438

(22) Filed: Oct. 29, 2020

(65) Prior Publication Data

US 2021/0129398 A1    May 6, 2021

(30) Foreign Application Priority Data

Oct. 30, 2019 (CH) .................... 01374/19

(51) Int. Cl.
| | | |
|---|---|---|
| *B29C 45/14* | (2006.01) | |
| *B29C 45/00* | (2006.01) | |
| *B29K 23/00* | (2006.01) | |
| *B29K 25/00* | (2006.01) | |
| *B29K 77/00* | (2006.01) | |
| *B29K 79/00* | (2006.01) | |

(52) U.S. Cl.
CPC .......... *B29C 45/14* (2013.01); *B29C 45/0001* (2013.01); *B29C 45/0003* (2013.01); *B29C 2045/0089* (2013.01); *B29K 2023/00* (2013.01); *B29K 2025/06* (2013.01); *B29K 2025/08* (2013.01); *B29K 2077/00* (2013.01); *B29K 2079/08* (2013.01)

(58) Field of Classification Search
CPC ......... B32B 27/32; B32B 27/34; C08L 77/00; B29C 66/71; B29C 45/14311; B29K 2077/00
See application file for complete search history.

(56) References Cited

U.S. PATENT DOCUMENTS

| | | | | |
|---|---|---|---|---|
| 2002/0082352 | A1* | 6/2002 | Schmitz | .................. B32B 27/34 |
| | | | | 428/474.9 |
| 2012/0027983 | A1* | 2/2012 | Elia | ........................ B32B 27/34 |
| | | | | 428/68 |
| 2012/0277360 | A1 | 11/2012 | Scheffer | |
| 2014/0370252 | A1* | 12/2014 | Regnier | .................. B32B 27/36 |
| | | | | 156/60 |

FOREIGN PATENT DOCUMENTS

| | | | |
|---|---|---|---|
| DE | 19736345 A1 | | 2/1999 |
| EP | 1541336 A1 | | 6/2005 |
| JP | H11207904 | * | 8/1999 |
| WO | 2011138300 A | | 11/2011 |
| WO | 2015024911 | | 2/2015 |
| WO | 2015024912 A | | 2/2015 |

OTHER PUBLICATIONS

European Search Report issued in connection with European Application No. 20204254.5, dated Apr. 15, 2021.

* cited by examiner

*Primary Examiner* — Gregory Listvoyb
(74) *Attorney, Agent, or Firm* — Dennemeyer & Associates LLC

(57) ABSTRACT

A composite containing directly adjoining and firmly bonded sections (I) and (II) of the following type:
(I) section, formed from a thermoplastic moulding compound FM-1 containing at least one polyamide (A) and optionally fillers and reinforcing materials (C) and additives (D);
(II) section, formed from a thermoplastic moulding compound containing at least one olefinic and/or vinyl aromatic polymer (E) and optionally fillers and reinforcing agents (F), plasticisers (G) and additives (H);
wherein the moulding compound FM-1 or FM-2 contains 0.1 to 5.0 percent by weight of polyethyleneimine (B) or a copolymer or derivative thereof and a method for producing such composites.

17 Claims, 1 Drawing Sheet

MATERIAL COMPOSITES

CROSS-REFERENCE TO RELATED APPLICATIONS

This application claims priority to Swiss application 01374/19, filed Oct. 30, 2019, which is hereby incorporated by reference in its entirety.

TECHNICAL FIELD

The present invention relates to material composites in which sections based on polyamides and sections based on olefinic/vinyl aromatic polymers are firmly connected to one another at the contact zones of the two sections without an intermediate layer or adhesive, as well as methods for producing said material composites.

PRIOR ART

Thermoplastic polyamide materials have established themselves in many areas for the production of structural components, due, inter alia, to their good mechanical properties, resistance to chemicals, good processability, low specific weight, etc., especially in the automotive sector, but also in the electronics sector, for example for housings of portable devices.

Soft, highly flexible plastics are used for switch covers, in particular in the field of automobile remote control keys, but also in the field of other electrical and electronic devices, especially if they require protection from the ingress of moisture or water. These covers made of highly flexible olefinic/vinyl aromatic polymers must be bonded to the rigid housing components and the adhesion strength should be as strong as possible. Often it is also required that this composite be resistant to higher temperatures and the simultaneous presence of moisture/water. As a rule, the adhesion strength between rigid polyamide and soft olefinic/vinyl aromatic polymer is improved by adding a certain amount of olefinic/vinyl aromatic polymers to the polyamide moulding compound or by grafting the olefinic/vinyl aromatic polymers with carboxylic acid or anhydride groups.

The problem in this connection is that the adhesion between olefinic/vinyl aromatic polymers and the modified polyamide or between the modified olefinic/vinyl aromatic polymers and the polyamide is insufficient after storage at elevated temperature and/or humidity. Modified olefinic/vinyl aromatic polymers adhere directly after the composite has been produced but lose their adhesion strength very quickly after storage at a temperature of 70° C. and a relative humidity of 62%. If the polyamide is modified with a suitable amount of flexible component, the excellent mechanical properties, the good processability and the other properties of the polyamide mentioned above are lost. This is where the present invention comes into play.

DESCRIPTION OF THE INVENTION

It is accordingly the object of the invention to provide a thermoplastic material composite based on thermoplastic polyamides and thermoplastic, olefinic/vinyl aromatic polymers, which has suitable mechanical properties for the applications mentioned, but at the same time also has excellent adhesion strength after storage at elevated temperatures and with the presence of humidity, in particular a temperature of 70° C. and a relative humidity of at least 50%. This object is achieved by the subject matter of the claims, in particular by a composite of at least one section based on polyamide and at least one adjoining section made of olefinic/vinyl aromatic polymers and the use of polyethyleneimines, or copolymers or derivatives thereof, to improve the adhesion strength between the different sections.

A core of the invention is ultimately that it was unexpectedly found that polyethyleneimines exceptionally improve the adhesion between a thermoplastic polyamide moulding compound and a thermoplastic moulding compound based on olefinic/vinyl aromatic polymers, in particular containing polystyrene block copolymers, such as SEBS and SEBS-g-MAH. The polyethyleneimines can be added to the polyamide moulding compound or to the moulding compound based on the olefinic/vinyl aromatic polymers. And this without losing the advantageous mechanical properties of the moulding compounds based on polyamides or olefinic/vinyl-aromatic polymers. In addition, surprisingly, this high adhesion strength is retained for a long time even under the influence of heat and moisture. The composite according to the invention preferably achieves (unstored or after production) an adhesion strength (peel force) of at least 50 N, in particular at least 70 N. Furthermore, the adhesion strength of the composite according to the invention decreases during storage for 120 hours at 70° C. and 62% relative humidity preferably by less than 30%, particularly preferably by less than 20%, based on the initial value before storage. The adhesion strength is determined by means of a roller peel test at 23° C., in which the 30 mm wide section (II) of the composite moulded body used for the measurement is moved over a roller at an angle of 90° with a tensile speed of 50 mm/min and is peeled from section (I); the average peel force [N] over the measuring section is given as the adhesion strength.

It is basically known from other fields that polyethyleneimines can be added to a polyamide moulding compound, but, in relation to the question of adhesion strength, not to thermoplastic elastomers, in particular to moulding compounds based on olefinic/vinyl aromatic polymers.

In connection with the prior art, reference is made to the following documents:

WO-A-2015024912 and similarly WO2015024911 describe a composite plastic part which has a first plastic component and a second plastic component and contains a polyethyleneimine to improve the adhesion between them. They also relate to a method for producing this composite plastic part, a method for improving the adhesion between a first plastic component and a second plastic component in a composite plastic part, and the use of polyethyleneimine to improve the adhesion between a first plastic component and a second plastic component in a composite plastic part. Both plastic components are made of polyamide. In addition, a plastic component contains a three-dimensional reinforcing fabric and cannot therefore be thermoplastically processed by injection moulding or extrusion. A reinforcing fibre-free film based on polyamide is used as the adhesion-enhancing layer between the two plastic components. Thus, all the contact zones described are formed by moulding compounds based on polyamide.

WO-A-2011138300 describes a composite part which consists of at least one section made of a polyamide moulding compound and at least one section made of a vulcanised elastomer, for example EPDM, EPM, ACM, fluororubber, NBR, H-NBR or AEM, individually or in combination. The polyamide moulding compound consists of at least 40% by weight of a mixture of the following components: a) 60 to 99 parts by weight of polyamide and b) 1 to 40 parts by weight of a graft copolymer which can be prepared using the following monomers: a) 0.5 to 25% by weight, based on the graft copolymer, of a polyamine having at least 4 nitrogen atoms and b) 75 to 99.5% by weight, based on the graft copolymer, of polyamide-forming monomers selected from lactams and w-aminocarboxylic acids and/or equimolar combinations of diamine and dicarboxylic acid, the sum of the parts by weight of a) and b) being 100. The presence of the graft copolymer is said to provide improved adhesion between the sections.

The thermoplastic polyamide moulding compounds or composite parts proposed here in the context of this application are free of the sort of crosslinked or vulcanised elastomer elements that can contain, for example, EPDM, EPM, ACM, fluororubber, NBR, H-NBR or AEM individually or in combination. The elastomers can be used in the form of a rubber compound which contains, for example, vulcanising agents, vulcanisation activators, oils and/or fillers. The thermoplastic polyamide moulding compounds proposed here are also preferably free of graft copolymer, which can be prepared using the following monomers: a) 0.5 to 25% by weight, based on the graft copolymer, of a polyamine with at least 4 nitrogen atoms and b) 75 to 99.5% by weight, based on the graft copolymer, of polyamide-forming monomers selected from lactams, w-aminocarboxylic acids and/or equimolar combinations of diamine and dicarboxylic acid, the sum of the parts by weight of a) and b) being 100.

In the context of this application, preference is given to using exclusively ungrafted polyethyleneimines as component (B), i.e. the moulding compound as a whole is free of grafted polyethyleneimines.

EP-A-1541336 relates to a thermoplastic multilayer composite made up of at least one first layer based on fluoropolymers, as well as at least one further second layer directly adjacent, at least in sections, to the first layer. In such a multilayer composite, adhesion between the two layers is achieved by basing the second layer on polyamide/polyamine copolymers. Such a second layer can particularly advantageously be used as an adhesion promoter layer for a further third layer which is based on polyamide. In the form of a hollow body or hollow profile, such a structure made up of at least 3 layers can be used as a fuel line in the motor vehicle sector.

In the context of this application, preference is given to exclusively using polyethyleneimines as component (B) which do not contain any amide-forming copolymer units, i.e. the moulding compound as a whole is free of polyethyleneimines which contain amide-forming copolymer units.

DE 197 36 345 A1 relates to a thermoplastic multicomponent injection moulding compound made of at least partially incompatible individual components, in which the individual components, polyamide moulding compound and modified block copolymer, are firmly bonded to one another by injection moulding or extrusion. The block copolymer is based on vinyl aromatic and olefinic monomers and is grafted with carboxylic groups or groups derived therefrom. The polyamide moulding compound contains the modified block copolymer to improve adhesion. The adhesion strength is good immediately after injection moulding but, when stored in a standard climate (70° C./62% relative humidity), drops to inadequate values after 1 to 2 days.

Specifically, the present invention accordingly relates to a composite containing directly adjoining and firmly bonded sections (I) and (II) of the following type:

(I) section, formed from a thermoplastic moulding compound FM-1 containing at least one polyamide (A) and optionally fillers and/or reinforcing materials (C) and additives (D);
(II) section, formed from a thermoplastic moulding compound FM-2 containing at least one olefinic and/or vinyl aromatic polymer (E) and optionally fillers and reinforcing agents (F), plasticisers (G) and additives (H);
wherein the moulding compound FM-1 or the moulding compound FM-2 contains 0.1 to 5.0 percent by weight of polyethyleneimine (B) or a copolymer or derivative thereof.

The moulding compound FM-1 or FM-2 preferably contains the polyethyleneimine (B) in a proportion of 0.5-4.0 percent by weight, particularly preferably in a proportion of 0.8-3.0 percent by weight, each based on the total weight of the moulding compound FM-1 or FM-2.

The composite according to the invention accordingly represents a moulded body in which there is at least one section (I) and at least one section (II) which are firmly bonded to one another at least at one point or at least one contact surface, without the involvement of an adhesion-promoting intermediate layer or an adhesive. I.e. the sections (I) and (II) are in direct contact with at least one point and are connected to one another via this contact. For example, if one or both sections are flat, the contact surface can only be limited to a single narrow side surface of the section under consideration or encompass all side surfaces of a section or it can also be characterised by partial or complete overlapping of the upper or lower surface of the sections. For example, the section (II) can also be connected with one or all of the side surfaces and part of its top or bottom side to the section (1).

The material composite according to the invention is preferably a hard-soft composite in which the sections (I) have a higher Shore hardness D or A than the sections (II), each determined according to ISO 7619-1 (2012-02) in the dry state. In this context, it is particularly preferred if the sections (I) have a Shore hardness of at least 70D, preferably of at least 75D and particularly preferably of at least 80D and/or the sections (II) a Shore hardness of at most 60D, preferably at most 50D and particularly preferably of at most 39D or 90A, each determined according to ISO 7619-1 (2012-02) in the dry state.

Furthermore, the modulus of elasticity of the sections (I) is preferably greater than the modulus of elasticity of the sections (II), each determined according to ISO 527 (2012) in the dry state. It is preferred that section (I) has a modulus of elasticity of at least 1000 MPa, preferably of at least 4000 MPa and particularly preferably of at least 8000 MPa and/or section (II) preferably has a modulus of elasticity of at most 500 MPa, of at most 300 MPa, and particularly preferably of at most 200 MPa.

The composite material according to the invention preferably represents a hard-soft composite in which rigid (hard) and flexible (soft) sections are present next to one another and are connected to one another at least at one point or at least in one contact surface. The rigid (hard) sections (I) and flexible (soft) sections (II) preferably form different areas of the moulded body independently and are only at the contact transitions between the sections, i.e. the contact points or surfaces, which, as explained above, can be connected to one another by abutting and/or overlapping, for example. In this way, the special, vastly different material properties of the individual sections (I) and (II) in the composite come fully into play. This means that completely different moulding compounds have to be used to produce the various sections. The moulding compound FM-1 based on polyamides is used to produce the hard sections (I) and the moulding compound FM-2 based on olefinic/vinyl aromatic polymers is used to produce the sections (II).

For the purposes of the present invention, the terms "olefinic/vinyl aromatic polymer" and "olefinic and/or vinyl aromatic polymer" are used synonymously and include a generic term which includes both homo- and copolyolefins and copolymers made from vinyl aromatic and olefinic monomers, as well as their modifications grafted with carboxylic acid or carboxylic anhydride groups.

In the context of the present invention, the term "polyamide" (abbreviation PA) is understood to be a generic term which includes homopolyamides and copolyamides. The selected spellings and abbreviations for polyamides and their monomers correspond to those specified in ISO 16396-1 (2015 (D)). In the following, the abbreviations used are used synonymously with the IUPAC names of the monomers, in particular the following abbreviations for monomers occur: MACM for bis(4-amino-3-methyl-cyclohexyl)methane (also known as 3,3'-dimethyl-4,4'-diaminodicyclo-hexylmethane, CAS No. 6864-37-5), PACM for bis(4-amino-cyclohexyl)methane (also known as 4,4'-diaminodicyclohexyl methane, CAS No. 1761-71-3), TMDC for bis(4-amino-3,5-dimethyl-cyclohexyl)methane (also called 3,3',5,5'-tetramethyl-4,4'-diamino-dicyclohexyl-methane, CAS No. 65962-45-0), T for terephthalic acid (CAS No. 100-21-0), I for isophthalic acid (CAS No. 121-95-5).

Compared to the partially crystalline polyamides, amorphous polyamides have no or only an extremely low, scarcely detectable heat of fusion. In the Differential Scanning Calorimetry (DSC) according to ISO 11357 (2013) at a heating rate of 20 K/min, the amorphous polyamides preferably show a heat of fusion of a maximum of 5 J/g, particularly preferably a maximum of 3 J/g, very particularly preferably from 0 to 1 J/g. Amorphous polyamides do not have a melting point due to their amorphous nature.

For the purposes of the invention, partially crystalline polyamides are those polyamides which, in the Differential Scanning Calorimetry (DSC) according to ISO 11357 (2013) at a heating rate of 20 K/min, preferably have a heat of fusion of more than 5 J/g, particularly preferably of at least 25 J/g, very particularly preferably of at least 30 J/g.

According to a first preferred embodiment, the composite according to the invention is characterised in that the thermoplastic moulding compound FM-1 contains the following components:
(A) 30-99.9 percent by weight of at least one polyamide;
(B) 0.1-5.0 percent by weight polyethyleneimine or copolymers or derivatives thereof;
(C) 0-60 percent by weight fillers and/or reinforcing materials;
(D) 0-5.0 percent by weight additives other than (A)-(C);
the sum of (A)-(D) being 100 percent by weight of the thermoplastic polyamide moulding compound FM-1,
and in that the thermoplastic moulding compound FM-2 contains the following components:
(E) 45-100 percent by weight of at least one olefinic and/or vinyl aromatic polymer;
(F) 0-15 percent by weight fillers and/or reinforcing materials;
(G) 0-35 percent by weight plasticiser;
(H) 0-5.0 percent by weight additives other than (E), (F) and (G);
the sum of (E)-(H) being 100 percent by weight of the thermoplastic moulding compound FM-2. The moulding compound FM-2 is free of component (B).

According to a second preferred embodiment, the composite is characterised in that the thermoplastic moulding compound FM-1 contains the following components:
(A) 35-100 percent by weight of at least one polyamide;
(C) 0-60 percent by weight fillers and/or reinforcing materials;
(D) 0-5.0 percent by weight additives other than (A) and (C);
the sum of (A), (C) and (D) being 100 percent by weight of the thermoplastic polyamide moulding compound FM-1,
and in that the thermoplastic moulding compound FM-2 contains the following components:
(E) 40-99.9 percent by weight of at least one olefinic and/or vinyl aromatic polymer;
(B) 0.1-5.0 percent by weight polyethyleneimine or copolymers or derivatives thereof;
(F) 0-15 percent by weight fillers and/or reinforcing materials;
(G) 0-35 percent by weight plasticiser;
(H) 0-5.0 percent by weight additives other than (E), (F), (G) and (B);
the sum of (B) and (E)-(H) being 100 percent by weight of the thermoplastic moulding compound FM-2. The moulding compound FM-1 is free of component (B).

The at least one polyamide (A) of the moulding compound FM-1 is preferably present in a proportion of 31-79.5 percent by weight, particularly preferably 40-74 percent by weight, based on the total weight of the moulding compound FM-1, if the moulding compound FM-1 contains the component (B) (first preferred embodiment), or preferably in a proportion of 35-80 percent by weight, particularly preferably 43-74.8 percent by weight, based on the total weight of the moulding compound FM-1, if the moulding compound FM-1 is free of component (B) (second preferred embodiment).

The at least one olefinic and/or vinyl aromatic polymer (E) of the moulding compound FM-2 is preferably present in a proportion of 51-94.4 percent by weight, particularly preferably 62-89 percent by weight, based on the total weight of the moulding compound FM-2, if the moulding compound FM-2 contains component (B) (second preferred embodiment), or preferably in a proportion of 55-94.9 percent by weight, particularly preferably 65-89.8 percent by weight, based on the total weight of the moulding compound FM-2, if the moulding compound FM-2 is free of component (B) (first preferred embodiment).

It is also preferred that the moulding compound FM-2 contains as component (E) at least one vinyl aromatic polymer and optionally at least one polyolefin. It is particularly preferred if the moulding compound FM-2 contains at least 50 percent by weight, in particular at least 70 percent by weight, based in each case on the total amount of (E), of a vinyl aromatic polymer.

The at least one olefinic and/or vinyl aromatic polymer (E) of the moulding compound FM-2 is preferably selected from the group consisting of: styrene-ethylene-butylene-styrene block copolymers (SEBS), styrene-ethylene-propylene-styrene block copolymers (SEPS), styrene-butylene-styrene block copolymers (SBS), styrene-styrene-butylene-styrene block copolymers (SSBS), polyethylene (PE), polypropylene (PP), polybutadiene (PB), poly-4-methylpentene, ethylene-propylene copolymers, ethylene-butene copolymers, ethylene-methylhexadiene copolymers, propylene-methylhexadiene copolymers, ethylene-octene copolymers, ethylene-propylene-butene copolymers, ethylene-propylene-hexene copolymers, ethylene-propylenemethylhexadiene copolymers, poly (ethylene-vinyl acetate) (EVA), ethylene-ethyl acrylate copolymer (EEA), ethylene-hexene copolymer, ethylene-propylene-diene terpolymers, and mixtures of these polymer materials.

Furthermore, it is preferred if the at least one olefinic and/or vinyl aromatic polymer (E) of the moulding compound FM-2 is grafted with carboxylic acid or carboxylic anhydride groups, wherein the grafting is carried out particularly preferably with acrylic acid, methacrylic acid or maleic anhydride and/or the degree of grafting is preferably 0.1 to 4.0 percent by weight, more preferably 0.4 to 2.5 percent by weight and particularly preferably 0.5 to 2.0 percent by weight, each based on the grafted polymer (E).

The polyamides of component (A) are partially crystalline, acyclic, aliphatic polyamides, partially crystalline, partially aromatic polyamides, cycloaliphatic polyamides, amorphous, partially aromatic polyamides or mixtures of these polyamides, particularly preferably each of the AABB type, i.e. composed of dicarboxylic acids and diamines, wherein additional subordinate proportions of lactams and amino acids may be present as components.

The following monomers, for example, are suitable as diamines for component (A): 1,4-butanediamine, 2-methyl-1,5-pentanediamine, 2-butyl-2-ethyl-1,5-pentanediamine, 1,6-hexanediamine, 2,2,4-trimethylhexamethylenediamine, 2,4,4-trimethyl hexamethylene diamine, 1,7-heptane diamine, 1,8-octane diamine, 2-methyl-1,8-octane diamine, 1,9-nonane diamine, 1,10-decane diamine, 1,11-undecane diamine, 1,12-dodecane diamine, 1, 13-tridecanediamine, 1,14-tetradecanediamine, m-xylylenediamine and p-xylylene diamine, wherein 1,6-hexanediamine, 1,10-decanediamine and 1,12-dodecanediamine are preferred.

The following monomers, for example, can be used as dicarboxylic acids for component (A): adipic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, C36-dimeric fatty acid and/or cis- and/or trans-1,4-cyclohexanoic acid and/or cyclohexanoic acid trans-cyolohexane-1,3-dicarboxylic acid (CHDA), terephthalic acid, isophthalic acid, naphthalenedicarboxylic acid, in particular 1,5-naphthalenedicarboxylic acid and 2,6-naphthalenedicarboxylic acid and mixtures thereof. Adipic acid, sebacic acid, tetradecanedioic acid, hexadecanedioic acid and dodecanedioic acid are preferred.

Furthermore, the polyamides (A) can also contain lactams or aminocarboxylic acids, in particular α,ω-amino acids or lactams with 6 to 12 carbon atoms, the following selection being mentioned as examples: m-aminobenzoic acid, p-aminobenzoic acid, caprolactam (CL), α,ω-aminocaproic acid, α,ω-aminoheptanoic acid, α,ω-aminooctanoic acid, α,ω-aminononanoic acid, α,ω-aminodecanoic acid, α,ω-aminoundecanoic acid (AUA), laurolactam (LL) and α,ω-aminododecanoic acid (ADA). Caprolactam, aminocaproic acid, α,ω-aminoundecanoic acid, laurolactam and α,ω-aminododecanoic acid are particularly preferred. The proportion of these lactams or amino acids, however, is preferably less than 50 percent by weight based on the total mass of the polyamide (A), more preferably less than 20 percent by weight, particularly preferably less than ten percent by weight.

The partially crystalline, acyclic, aliphatic polyamides (A1) are preferably selected from the group consisting of: 46, 56, 66, 66/6, 69, 610, 612, 614, 616, 618, 810, 1010, 1012, 1014, 1016, 1212, 11, 12, 6/12, 66/6/610, wherein 66, 610, 612, 614 and 616 are particularly preferred. Here and in the following, the designation "46" is to be understood as polyamide 46 or, in short, PA 46, for example. The partially crystalline, partially aromatic polyamides (A2) of component (A) are preferably selected from the group consisting of: 6T/6I, 6T/66, 6T/6I/66, 6T/610, 6T/612, 6T/614, 6T/616, 9T, 9MT (M=2-methyloctane-1,8-diamine), 10T, 12T, 10T/6T, 11/10T, 12/10T, 11/9T, 12/9T, 10T/1010, 10T/106, 10T/612, the proportion of terephthalic acid based on the total content of dicarboxylic acids, preferably more than 30 mol %, particularly preferably more than 50 mol %.

The polyamides of component (A) are also preferably selected from the group consisting of the cycloaliphatic polyamides (A3): MACM12/PACM12, MACM14/PACM14, MACM16/PACM16, MACM18/PACM18, 6I/6T/MACMI/MACMT/12, 6I/6T/612/MACMI/MACMT/MACM12, 6I/6T/614/MACMI/MACMT/MACM14, 6I/6T/616/MACMI/MACMT/MACM16, 6I/MACMI/MACMT, 6I/PACMI/PACMT, MACMI/MACMT/12, 6I/6T/MACMI, MACMI/MACM36, 12/PACMI, 12/MACMT, 6I/PACMT, 6/IPDT, MACM10, MACM12, MACM14, MACM16, MACM18, MACMI/12, PACM10, PACM12, MACM14, PACM16, PACM18, PACMI/12, TMDC10, TMDC12, TMDC16, TMDC18, MACMT/MACMI/12, PACMT/PACMI/12, or mixtures thereof.

Amorphous, partially aromatic polyamides (A4) can also be used as component (A), which are preferably selected from the group consisting of MXDI, MXDI/6i, MXD6/MXDI, 5I, 5T/5I, 6I, 6/6I, 6T/6I, 10T/10I, 3-6T (3–6=2,2,4- or 2,4,4-trimethylhexanediamine) or mixtures thereof, wherein the systems 5T/5I, 6T/6I or 10T/10I have a proportion of less than 50 mol % 5T, 6T or 10T units, and wherein a composition range 5T:5I, 6T:6I or 10T:10I from 20:80 to 45:55, in particular 25:75 to 40:60, is preferred.

The diamines for the cycloaliphatic polyamides (A3) are preferably selected from the group consisting of bis(4-amino-3-methyl-cyclohexyl)methane (MACM) and bis(4-aminocyclohexyl)methane (PACM), bis-(4-amino-3-ethyl-cyclohexyl)methane (EACM), bis(4-amino-3,5-dimethyl-cyclohexyl)methane (TMDC), 2,6-norbornanediamine (2,6-bis(aminomethyl)norbornane), 1,3-diaminocyclohexane, 1,4-diaminocyclohexanediamine, isophoronediamine, 1,3-bis(aminomethyl)cyclohexane, 1,4-bis(aminomethyl)cyclohexane, 2,2-(4,4'-diaminodicyclohexyl)propane, meta-xylylenediamine, para-xylylenediamine and mixtures thereof. The diamines are particularly preferably selected from the group consisting of bis(4-amino-3-methyl-cyclohexyl)methane (MACM) and bis(4-amino-cyclohexyl)methane (PACM) and mixtures thereof. Dicarboxylic acids for the cycloaliphatic polyamides component (A3) are preferably selected from the group consisting of terephthalic acid, isophthalic acid, naphthalenedicarboxylic acids (NDA), in particular 1,5-naphthalenedicarboxylic acid and 2,6-naphthalenedicarboxylic acid, 1,6-hexanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,16-hexadecanedioic acid, 1,18-octadecanedioic acid, and mixtures thereof. 1,6-hexanedioic acid, 1,10-decanedioic acid, 1,12-dodecanedioic acid, terephthalic acid, isophthalic acid and mixtures thereof are particularly preferred. Furthermore, caprolactam and laurolactam are preferred monomers for the production of the cycloaliphatic polyamides of component (A3).

The cycloaliphatic polyamides (A3) and the amorphous partially aromatic polyamides (A4) preferably have a glass transition point Tg above 90° C., preferably above 110° C., particularly preferably above 120° C.

The polyamides (A1) and (A2) preferably have a melting point of at least 170° C., preferably in the range 180-340° C. or, preferably if aliphatic (i.e. component A1), in the range 180-230° C.

The polyamides of component (A), in particular the polyamides (A1), (A2), (A3) and (A4), also preferably have a relative viscosity measured in m-cresol (0.5% by weight, 20° C.) in the range of 1.4 to 3.0, preferably in the range of 1.45 to 2.70, in particular in the range of 1.50 to 2.40.

In a further embodiment, it is particularly preferred that the at least one polyamide (A) of the moulding compound FM-1 contains the following components or consists of the following components:

20-100 percent by weight, preferably 40-80 percent by weight of at least one partially crystalline, acyclic aliphatic polyamide (A1) and/or at least one partially aromatic, partially crystalline polyamide (A2);

0-80 percent by weight, preferably 20-60 percent by weight of at least one cycloaliphatic polyamide (A3) and/or an amorphous, partially aromatic polyamide (A4), the percent by weight of components (A1) to (A4) adding up to 100 percent by weight of component (A).

In another particularly preferred embodiment of the composite, the at least one polyamide (A) of the moulding compound FM-1 contains the following components or consists of the following components:
(A1) 20-80 percent by weight, preferably 25-75 percent by weight of at least one partially crystalline, acyclic, aliphatic polyamide selected from the group consisting of PA66, PA610, PA612, PA614 and PA616;
(A4) 20-80 percent by weight, preferably 25-75 percent by weight of at least one amorphous, partially aromatic polyamide selected from the group consisting of 5T/5I, 6T/6I and 10T/10I,
the percent by weight of components (A1) and (A4) adding up to 100 percent by weight of component (A).

The moulding compound FM-1 preferably does not contain any olefinic/vinyl aromatic polymers, neither in grafted nor in ungrafted form, i.e. the moulding compound FM-1 is preferably free of component (E).

The moulding compound FM-2 contains as component (E) at least one olefinic and/or vinyl aromatic polymer. I.e. component (E) can comprise at least one olefinic polymer or at least one vinyl aromatic polymer or a combination of at least one olefinic and at least one vinyl aromatic polymer. The olefinic polymers are homo- or co-polyolefins, particularly preferably polymers based on ethylene, propylene and butylene or their copolymers and copolymers with other αolefinic monomers, in particular 1-pentene, 1-hexene, 1-heptene, 1-octene and 1-decene. The vinyl aromatic polymer is preferably a copolymer of styrene with other monomers which have at least one olefinic double bond, such as, for example the αolefins ethylene, propylene and butylene or acrylic acid or acrylic acid ester or butadiene. Block copolymers having at least one block formed from vinyl aromatic monomers (block A) and at least one block formed from olefinic monomers (block B), such as are contained, for example, in styrene block copolymers, are particularly preferred. Furthermore, mixtures of styrene block copolymers and polyolefins are also preferred.

The olefinic and/or vinyl aromatic polymers that are used as a constituent of component (E) can be a natural rubber, polybutadiene, polyisoprene, polyisobutylene, a copolymer of butadiene and/or isoprene with styrene or styrene derivatives and other comonomers, a hydrogenated copolymer and/or be or contain a copolymer which has been formed by grafting or copolymerisation with acid anhydrides, (meth) acrylic acid and its esters. The polymers (E) can also be a graft rubber with a crosslinked elastomeric core consisting of butadiene, isoprene or alkyl acrylates and a graft shell made of polystyrene, a non-polar or polar olefin homo- and co-polymer such as ethylene-propylene-, ethylene-propylene-diene and ethylene-octene or ethylene-vinylacteate rubber or a non-polar or polar olefin homo- and co-polymer which has been formed by grafting or copolymerisation with acid anhydrides, (meth)acrylic acid and its esters. The polymers (E) can also be a carboxylic acid-functionalised copolymer such as poly(ethene-co-(meth)acrylic acid) or poly (ethene-co-1-olefin-co-(meth)acrylic acid), the 1-olefin being an alkene or an unsaturated (meth)acrylic acid ester with more than 4 atoms, including those copolymers in which the acid groups are partially neutralised with metal ions.

The polymers (E) are preferably based on styrene monomers (styrene and styrene derivatives) and other vinyl aromatic monomers and are built up as block copolymers from alkenyl aromatic compounds and a conjugated diene and hydrogenated block copolymers from an alkenyl aromatic compound and conjugated dienes or combinations of these polymer types. The block copolymer contains at least one block derived from an alkenyl aromatic compound (block A) and at least one block derived from a conjugated diene (block B). In the hydrogenated block copolymers, the proportion of aliphatically unsaturated carbon-carbon double bonds was reduced by hydrogenation. Two, three, four and multiblock copolymers with a linear structure are suitable as block copolymers. However, branched and stellate structures can also be used according to the invention. Branched block copolymers are obtained in a known manner, for example by grafting reactions of polymeric "side branches" onto a polymer main chain.

As alkenyl aromatic monomers, in addition to or in a mixture with styrene, vinyl aromatic monomers can also be used which are substituted on the aromatic ring and/or on the C=C double bond with C1-20 hydrocarbon radicals or halogen atoms. Examples of preferred alkenyl aromatic monomers are styrene, p-methylstyrene, amethylstyrene, ethylstyrene, tert-butylstyrene, vinyltoluene, 1,2-diphenylethylene, 1,1-diphenylethylene, vinylxylenes, vinyltoluenes, vinylnaphthalenes, divinylbenzenes, bromostyrenes, chlorostyrenes, and combinations thereof. Preference is given to styrene, p-methylstyrene, amethylstyrene and vinyl naphthalene.

Examples of diene monomers include 1,3-butadiene, 2-methyl-1,3-butadiene, 2,3-dimethyl-1,3-butadiene, 1,3-pentadiene, 1,3-hexadiene, isoprene, chloroprene and piperylene. 1,3-butadiene and isoprene are preferred, in particular 1,3-butadiene (hereinafter referred to as butadiene for short).

The preferred alkenyl aromatic monomer is styrene and the diene monomer butadiene, i.e. styrene-butadiene block copolymers are preferred. As a rule, these block copolymers are prepared by anionic polymerisation in a manner known per se.

In addition to the styrene and diene monomers, further comonomers can also be used. The proportion of comonomers is preferably from 0 to 50, particularly preferably from 0 to 30 and in particular from 0 to 15% by weight, based on the total amount of the monomers used. Suitable comonomers are, for example, acrylates, in particular C1-12-alkyl acrylates such as n-butyl acrylate or 2-ethylhexyl acrylate, and the corresponding methacrylates, in particular C1-12-alkyl methacrylates such as methyl methacrylate (MMA). Further possible comonomers are (meth)acrylonitrile, glycidyl(meth)acrylate, vinyl methyl ether, diallyl and divinyl ethers of bifunctional alcohols, divinylbenzene and vinyl acetate.

In addition to the conjugated diene, the hydrogenated block copolymers may also contain proportions of lower hydrocarbons, such as ethylene, propylene, 1-butene, dicyclopentadiene or non-conjugated dienes. In the hydrogenated block copolymers, the proportion of non-reduced aliphatic unsaturated bonds resulting from the B block is less than 50%, preferably less than 25%, in particular less than 10%. The aromatic proportions from block A are preferably reduced to a maximum of 25%. The hydrogenated block copolymers styrene(ethylene-butylene) two-block and styrene(ethylene-butylene)-styrene three-block copolymers are obtained by hydrogenating styrene-butadiene and styrene-butadiene-styrene copolymers.

The block copolymers preferably consist of 20 to 90% by weight of block A, in particular 25 to 60% by weight of block A. The diene can be incorporated into the B block in 1,2 or 1,4 orientations.

The molecular weight of the block copolymers is 5,000 to 500,000 g/mol, preferably 20,000 to 300,000 g/mol, in particular 40,000 to 200,000 g/mol.

Suitable hydrogenated block copolymers include the commercially available products, such as, for example, KRATON® (Kraton Polymers) G1650, G1651, and G1652 and TUFTEC® (Asahi Chemical) H1041, H1043, H1052, H1062, H1141 and H1272.

Examples of non-hydrogenated block copolymers are polystyrene-polybutadiene, polystyrene-poly(ethylene-propylene), polystyrene-polyisoprene, poly($\alpha$-methylstyrene)-polybutadiene, polystyrene-polybutadiene-polystyrene (SBS), polystyrene-poly(ethylene-propylene)-polystyrene (SEPS), polystyrene-polyisoprene-polystyrene and poly (a-methylstyrene-polybutadiene-poly($\alpha$-methylstyrene), as well as combinations thereof.

Suitable non-hydrogenated block copolymers that are commercially available include various products with the brand names SOLPRENE® (Phillips), KRATON® (Shell), VECTOR® (Dexco) and SEPTON® (Kuraray).

According to a further preferred embodiment, the moulding compounds according to the invention are characterised in that component (E) contains a polyolefin homopolymer or an ethylene$\alpha$-olefin copolymer, particularly preferably an EP and/or EPDM elastomer (ethylene-propylene rubber or ethylene-propylene-diene rubber). For example, this can be an elastomer based on an ethylene C3-12$\alpha$-olefin copolymer with 20 to 96, preferably 25 to 85% by weight of ethylene, with the C3-12-$\alpha$-olefin being an olefin selected from the group consisting of propene, 1-butene, 1-pentene, 1-hexene, 1-octene, 1-decene and/or 1-dodecene, and component (E) is particularly preferably ethylene-propylene, ethylene-butylene, ethylene-octene rubber and/or LLDPE and/or VLDPE.

Alternatively or additionally (for example in a mixture), (E) can contain a terpolymer based on ethylene-C3-12-$\alpha$olefin having an unconjugated diene, this preferably containing 25 to 85% by weight ethylene and up to a maximum of 10% by weight of an unconjugated diene, wherein for the C3-12-$\alpha$-olefin an olefin is particularly preferred that is selected from the group consisting of propene, 1-butene, 1-pentene, 1-hexene, 1-octene, 1-decene and/or 1-dodecene, and/or wherein the unconjugated diene is preferably selected from group consisting of bicyclo(2,2,1)heptadiene, hexadiene-1.4, dicyclopentadiene and/or in particular 5-ethylidene norbornene.

Component (E) preferably has constituents with carboxylic acid or carboxylic anhydride groups which, through thermal or radical reaction of the main chain polymer with an unsaturated dicarboxylic acid anhydride, an unsaturated dicarboxylic acid or an unsaturated dicarboxylic acid monoalkyl ester, are preferably used for this purpose with reagents selected from the following group: acrylic acid, maleic acid, maleic anhydride, maleic acid monobutyl ester, fumaric acid, aconitic acid and/or itaconic acid anhydride.

Preferably 0.1 to 4.0% by weight of an unsaturated anhydride or an unsaturated dicarboxylic acid is grafted onto the polymers (E). In general, the degree of grafting is preferably in a range from 0.4-2.5%, particularly preferably in a range from 0.5-2.0%.

A mixture of an ethylene-propylene copolymer and an ethylene-butylene copolymer, this with a maleic anhydride degree of grafting (MAH degree of grafting) in the range of 0.4-2.5% by weight, is also possible as a constituent of component (E).

The elastomeric polyolefins can be statistical, alternating or segmented copolymers with linear, branched or core-shell structure and preferably contain functional groups and thus include homopolymers or copolymers of olefins, such as ethylene, propylene, butene-1, or copolymers of olefins and copolymerizable monomers such as vinyl acetate, (meth) acrylic acid ester and methylhexadiene.

Examples of crystalline olefin polymers include low, medium and high density polyethylenes, polypropylene, polybutadiene, poly-4-methylpentene, ethylene-propylene block or statistical copolymers, ethylene-methylhexadiene copolymers, propylene-methylhexadiene copolymers, ethylene-propylene butene copolymers, ethylene-propylene-hexene copolymers, ethylene-propylene-methylhexadiene copolymers, poly(ethylene-vinyl acetate) (EVA), poly(ethylene-ethyl acrylate) (EEA), ethylene-octene copolymer, ethylene-butene copolymers, ethylene-hexene copolymers, ethylene-propylene-diene terpolymers and combinations of the polymers mentioned.

Also preferred is an ionomer in which the polymer-bound carboxyl groups are wholly or partially bonded to one another by metal ions.

Copolymers of butadiene with styrene functionalised by grafting with maleic anhydride, nonpolar or polar olefin homo- and copolymers formed by grafting with maleic anhydride and carboxylic acid-functionalised copolymers such as poly(ethene-co-(meth)arylic acid) or poly(ethene-co-1-olefin-co-(meth)acrylic acid) in which the acid groups are partially neutralised with metal ions are particularly preferred.

The polymers (E) are advantageously selected from the group consisting of: styrene-ethylene-butylene-styrene block copolymers (SEBS), styrene-ethylene-propylene-styrene block copolymers (SEPS), styrene-butylene-styrene block copolymers (SBS), styrene-styrene-butylene-styrene block copolymers (SSBS), ethylene/propylene copolymers, ethylene/propylene/diene copolymers (EPDM), polyethylene (PE), polypropylene (PP), polybutadiene (PB), poly-4-methylpentene, ethylene-propylene copolymers, ethylene-butene copolymers, ethylene-methylhexadiene copolymers, propylene-methylhexadiene copolymers, ethylene-octene copolymer, ethylene-propylene-butene copolymers, ethylene-propylene-hexene copolymers, ethylene-propylene-methylhexadiene copolymers, poly (ethylene-vinyl acetate) (EVA), ethylene-ethyl acrylate copolymer (EEA), ethylene-hexene copolymers, ethylene-propylene-diene terpolymers, and mixtures of these polymer materials. These polymers (E) are particularly preferably grafted with acrylic acid, methacrylic acid or maleic anhydride, the degree of grafting being 0.1 to 4.0 percent by weight based on the grafted polymer (E).

A particularly preferred vinyl aromatic polymer of component (E) is styrene-ethylene/butylene-styrene copolymer (SEBS) and/or SEBS (SEBS-g-MAH) grafted with maleic anhydride (MAH). SEBS and SEBS-g-MAH preferably each contain 20 to 70% by weight of styrene. SEBS-g-MAH preferably has a melt volume flow rate (MVR) at 275° C. and a load of 5 kg of at least 80 ml/10 min, preferably 90 to 200 ml/10 min, particularly preferably 100 to 160 ml/10 min. The content of maleic anhydride in the SEBS-g-MAH is preferably 0.1 to 4.0% by weight, more preferably 0.4 to 2.5% by weight and particularly preferably 0.5 to 2.0% by weight.

Particularly preferred as olefinic polymer of component (E) are polyethylene (PE), polypropylene (PP), ethylene-propylene copolymers (EP), ethylene-butylene copolymers (EB), and those with maleic anhydride (MAH) or acrylic acid (AA) grafted modifications PE-g-MAH, PE-g-AA, PP-g-MAH, PP-g-AA, EP-g-MAH, EP-g-AA, EB-g-MAH, EB-g-AA as well as mixtures thereof. The content of acrylic acid or maleic anhydride in PE-g-MAH, PE-g-AA, PP-g-MAH, PP-g-AA, EP-g-MAH, EP-g-AA, EB-g-MAH and EB-g-AA is preferably 0.1 to 4.0% by weight, more preferably 0.4 to 2.5% by weight and particularly preferably 0.5 to 2.0% by weight.

Component (E) is preferably also composed of mixtures of the vinyl aromatic and olefinic polymers mentioned, in particular the mixtures of SEBS-g-MAH and PP, SEBS and PP-g-MAH and SEBS-g-MAH and PP-g-MAH preferred, the content of maleic anhydride in the PP-g-MAH and/or SEBS-g-MAH preferably 0.1 to 4.0% by weight, more preferably 0.4 to 2.5% by weight and particularly preferably 0.5 to 2.0% by weight.

The possible systems indicated above for the component can also be used in mixtures.

According to the invention, the moulding compound FM-1 or FM-2 comprises a certain proportion of polyethyleneimine as component (B). The proportion of component (B) in the moulding compounds FM-1 or FM-2 is preferably in the range of 0.5-4.0 percent by weight, preferably in the range of 0.8-3.0 percent by weight. Preferably, only the moulding compound FM-1 contains polyethyleneimine as component (B) in the stated amounts and the moulding compound FM-2 is free of component (B).

Polyethyleneimines of component (B) in the context of the present invention are understood to mean polymers in whose main chains there are NH or N groups which are each separated from one another by two methylene groups and as they are explained for example in the Encycl. Polym. Sci. Eng. 1, 680-739. For the purposes of the invention, both homo- and copolymers and their derivatives are included. Branched polyethyleneimines are preferably used.

The homopolymers are generally obtainable by polymerising ethyleneimine (aziridine) in aqueous or organic solution in the presence of acid-releasing compounds, acids, or Lewis acids. Such homopolymers are branched polymers which as a rule contain primary, secondary, and tertiary amino groups in a ratio of about 30% to 40% to 30%. The distribution of the amino groups, determined by means of $^{13}$C-NMR spectroscopy, is preferably in the range of 1:0.7:0.5 to 1:1.5:1, in particular 1:0.8:0.6 to 1:1.2:0.8, for the ratio of primary to secondary to tertiary amino groups.

Compounds which have at least two amino functions are preferably used as comonomers. Suitable comonomers are, for example, alkylenediamines with 2 to 10 carbon atoms in the alkylene radical, with ethylenediamine and propylenediamine being preferred. Other suitable comonomers are diethylenetriamine, triethylenetetramine, tetraethylenepentamine, dipropylenetriamine, tripropylenetriamine, diehexamethylenetriamine, aminopropylethylenediamine and bisaminopropylethylenediamine.

Likewise, suitable polyethyleneimines for the purposes of the invention include amidated polymers which are usually obtainable by reacting polyethyleneimines with carboxylic acids, their esters or anhydrides, carboxylic acid amides or carboxylic acid halides.

In addition, alkoxylated polyethyleneimines, which can be obtained, for example, by reacting polyethyleneimine with ethylene oxide and/or propylene oxide, are suitable. Other suitable polyethyleneimines according to the invention include hydroxyl-containing polyethyleneimines and amphoteric polyethyleneimines (incorporation of anionic groups), as well as lipophilic polyethyleneimines, which are generally obtained by incorporating long-chain hydrocarbon radicals into the polymer chain.

Polyethyleneimines usually have a weight average molecular weight (weight average) Mw of 600 to 3,000,000, preferably 700 to 2,000,000. The preferred Mw is 800 to 50,000, in particular from 1,100 to 25,000. The weight average molecular weight Mw is determined by means of light scattering according to ASTM D4001.

The polyethyleneimine of component (B) can be a branched polyethyleneimine with a number average molar mass Mn in the range of 500-50,000 or 500-25,000 g/mol, preferably in the range of 1000-2500 or 600-2000 g/mol.

The polyethyleneimine of component (B) is preferably a branched polyethyleneimine, which in particular has a ratio of primary to secondary amines in the range of 1:2-2:1, preferably in the range of 1.2:1-1:1.2 and/or a ratio of primary to tertiary amines in the range of 3:1-1:1, preferably in the range of 2:1-1.4:1 and/or a ratio of secondary to tertiary amines in the range of 3:1-1:1, preferably in the range of 2:1-1.2:1.

The polyethyleneimine of component (B) is preferably a branched polyethyleneimine with a content of primary amino end groups in the range of 5000-20,000 peq/g (mmol/kg), preferably in the range of 7,000-12,000 peq/g (mmol/kg).

The polyethyleneimine of component (B) is furthermore preferably a branched polyethyleneimine with a water content of less than 4 percent by weight, preferably less than 3 percent by weight, particularly preferably less than 2 percent by weight.

In addition, the proposed moulding compounds FM-1 and FM-2 can contain additives in the form of fillers and/or reinforcing materials in addition to the polyamide or olefinic/vinyl aromatic polymer and the polyethyleneimine, namely as component (C) or (F). Component (C) is preferably present in the moulding compound FM-1 in a proportion in the range of 20-60 percent by weight, preferably in the range of 25-55 percent by weight. In the moulding compound FM-2, the component (F) is preferably in a proportion in the range of 0-10 percent by weight; the moulding compound FM-2 is preferably free of component (F). The moulding compound FM-2 is furthermore preferably free of fibrous reinforcing materials (F2).

Components (C) and (F) preferably consist of:
particulate filler (Cl) or (F1), particularly preferably selected from the group consisting of: Soot, talc, mica, silicates, quartz, wollastonite, kaolin, silicic acids, magnesium carbonate, magnesium hydroxide, chalk, ground or precipitated calcium carbonate, lime, feldspar, inorganic pigments, including barium sulphate, zinc oxide, zinc sulphide, lithopone, titanium dioxide (rutile, anatase), iron oxide, iron manganese oxide, metal oxides, especially spinels, including copper iron spinel, copper chromium oxide, zinc-iron oxide, cobalt-chromium oxide, cobalt-aluminium oxide, magnesium aluminium oxide, copper-chromium-manganese mixed oxides, copper-manganese-iron mixed oxides, rutile pigments including titanium zinc rutile, nickel antimony titanate, chromium antimony titanate, hard or soft magnetic metals or alloys or ceramics, hollow spherical silicate fillers, aluminium oxide, boron nitride, boron carbide, aluminium nitride, calcium fluoride and other inorganic pigments and mixtures thereof;

and/or fibrous reinforcing material (C2) or (F2), preferably selected from the group consisting of: glass fibres, carbon fibres, graphite fibres, aramid fibres, nanotubes or mixtures thereof, wherein the fibres of components (C2) and (F2) can have circular or non-circular cross-sectional areas.

The fillers (C1) and (C2) as well as (F1) and (F2) can also be surface treated.

Components (C2) and (F2) are preferably a glass fibre which is or consists substantially of the components silicon dioxide, calcium oxide, magnesium oxide and aluminium oxide and the weight ratio $SiO_2/(CaO+MgO)$ is less than 2.7, preferably less than 2.5 and in particular between 2.1 and 2.4. In particular, component (C2) or (F2) is an E-glass fibre according to ASTM D578-00.

According to the invention, the glass fibre (components C2, F2) can also be a high-strength glass fibre, which is preferably based on the ternary system silicon dioxide-aluminium oxide-magnesium oxide or on the quaternary system silicon dioxide-aluminium oxide-magnesium oxide-calcium oxide, wherein a composition of 58-70% by weight silicon dioxide ($SiO_2$), 15-30% by weight aluminium oxide ($Al_2O_3$), 5-15% by weight magnesium oxide (MgO), 0-10% by weight calcium oxide (CaO) and 0-2% by weight of further oxides, such as zirconium dioxide ($ZrO_2$), boron oxide ($B_2O_3$), titanium dioxide ($TiO_2$) or lithium oxide ($Li_2O$), is preferred. The high-strength glass fibre preferably has a tensile strength of greater than or equal to 4000 MPa, and/or an elongation at break of at least 5% and a tensile modulus of elasticity of greater than 80 GPa. Specific examples of these high-strength glass fibres of component (C2) are S glass fibres from Owens Corning with 910 or 995 size, T glass fibres from Nittobo, HiPertex from 3B, HS4 glass fibres from Sinoma Jinjing Fiberglass, R glass fibres from Vetrotex and S-1 and S-2 glass fibres from AGY.

The glass fibres of components (C2) and (F2) can be in the form of short fibres, preferably in the form of cut glass with a length in the range of 0.2 to 20 mm, or in the form of continuous fibres (rovings).

The glass fibres according to the invention of components (C2) and (F2) preferably have a circular or non-circular cross-sectional area.

Glass fibres with a circular cross-section, i.e. round glass fibres, typically have a diameter in the range of 5-20 μm, preferably in the range of 6-17 μm and particularly preferably in the range of 6-13 μm. They are preferably used as short glass fibres (cut glass with a length of 0.2 to 20 mm, preferably 2-12 mm).

In the case of the flat glass fibres of components (C2) and (F2), i.e. glass fibres with a non-circular cross-sectional area, those with a dimension ratio from the main cross-sectional axis to the secondary cross-sectional axis perpendicular thereto of more than 2, preferably from 2 to 8, in particular from 2 to 5, are preferably used. These so-called flat glass fibres have an oval, elliptical, elliptical with constriction(s) (so-called cocoon fibre), polygonal, rectangular or almost rectangular cross-sectional area. Another characteristic feature of the flat glass fibres used is that the length of the main cross-sectional axis is preferably in the range of 6 to 40 μm, in particular in the range of 15 to 30 μm and the length of the secondary cross-sectional axis is in the range of 3 to 20 μm, in particular in the range of 4 to 10 μm. The flat glass fibres have the highest possible packing density, i.e. the cross-sectional area of the glass fibre fills an imaginary rectangle surrounding the glass fibre cross-section as precisely as possible to at least 70%, preferably at least 80% and particularly preferably at least 85%.

Mixtures of glass fibres with circular and non-circular cross-sections can also be used to reinforce the moulding compounds according to the invention, the proportion of flat glass fibres preferably predominating, i.e. making up more than 50% by weight of the total mass of the fibres.

The glass fibres according to the invention are preferably provided with a size suitable for the respective thermoplastic, in particular for polyamide, for example containing an adhesion promoter based on an amino or epoxysilane compound.

The E-glass fibres or high-strength glass fibres used as roving within components (C2) and (F2) according to a further preferred embodiment preferably have a diameter of 8 to 20 μm, preferably 12 to 18 μm, the cross-section of the glass fibres being round, oval, elliptical, elliptical provided with constriction(s), polygonal, rectangular or nearly rectangular. So-called flat glass fibres with a ratio of the cross-sectional axes of 2 to 5 are particularly preferred. These continuous fibres, particularly preferably within components (C2) and (F2), are incorporated into the polyamide moulding compounds according to the invention by known processes for the production of long fibre-reinforced rod granules (fibre length and granule length are identical), in particular by protrusion processes in which the endless fibre strand (roving) is completely saturated with the polymer melt and then cooled and cut. The long fibre-reinforced rod granules obtained in this way, which preferably have a granule length of 3 to 25 mm, in particular 4 to 12 mm, can be further processed into moulded parts using the usual processing methods (such as injection moulding or pressing). To reinforce the moulding compounds according to the invention, endless fibres (long glass fibres) can also be combined with cut fibres (short glass fibres).

Finally, the proposed moulding compounds FM-1 can also contain additives such as component (D) and the moulding compound FM-2 can also contain additives as component (H). The component (D) for the moulding compound FM-1 is preferably present in a proportion in the range of 0.1-4.0 percent by weight, preferably in the range of 0.2-2.0 percent by weight. The component (H) for the moulding compound FM-2 is preferably present in a proportion in the range of 0.1-4.0 percent by weight, preferably in the range of 0.2-2.0 percent by weight.

The additives of components (D) and (H) can be selected from the group consisting of: stabilisers, aging inhibitors, antioxidants, antiozonants, light stabilisers, UV stabilisers, UV absorbers, UV blockers, inorganic heat stabilisers, in particular based on copper halides and alkali halides and/or compounds of lanthanoids, organic heat stabilisers, conductivity additives, optical brighteners, processing aids, nucleating agents, crystallisation accelerators, crystallisation retarders, flow aids, lubricants, mould release agents, organic and dyes, markers and mixtures thereof.

The moulding compound FM-2 can also contain 0-35 percent by weight of a plasticiser as component (G). The moulding compound FM-2 preferably contains 5-35% by weight, particularly preferably 10-33% by weight, of a plasticiser. An oil with paraffinic and/or naphthenic proportions, which is preferably free of aromatic fractions, is preferably used as component (G). The term "paraffinic" denotes acyclic, saturated hydrocarbons while the term "naphthenic" denotes cyclic saturated hydrocarbons. Accordingly, plasticisers (G) based on aliphatic hydrocarbons, in particular acyclic and/or cyclic aliphatic hydrocarbons, are preferred. As a rule, there is a mixture of paraffinic and/or naphthenic hydrocarbons, which can be liquid, oily, pasty, or solid. Preference is given to paraffinic oils which, depending on their viscosity and melting point, are divided into liquid paraffins (paraffinum perliquidum), oily or pasty paraffins (paraffinum subliquidum) and solid paraffins (paraffinum solidum). Paraffinum perliquidum is particularly preferred.

In a preferred embodiment of the composite, the thermoplastic polyamide moulding compound FM-1 according to the invention consists of:
(A) 40-74 percent by weight of component (A) consisting of:
  20-100 percent by weight, preferably 40-80 percent by weight of at least one partially crystalline, acyclic aliphatic polyamide (A1) and/or at least one partially aromatic, partially crystalline polyamide (A2);
  0-80 percent by weight, preferably 20-60 percent by weight of at least one amorphous, partially aromatic polyamide (A4) and/or at least one cycloaliphatic polyamide (A3),
  the percent by weight of components (A1) to (A4) adding up to 100 percent by weight of component (A);
(B) 0.8-3.0 percent by weight polyethyleneimine;
(C) 25-55 percent by weight fillers and/or reinforcing materials;
(D) 0.2-2.0 percent by weight of additives other than (A)-(C);
the sum of (A)-(D) being 100 percent by weight of the thermoplastic polyamide moulding compound, and the thermoplastic moulding compound FM-2 according to the invention consists of:
(E) 55-94.9 percent by weight of at least one vinyl aromatic polymer selected from the group consisting of: styrene-ethylene-butylene-styrene block copolymers (SEBS), styrene-ethylene-propylene-styrene block copolymers (SEPS), styrene-butylene-styrene block copolymers (SBS), styrene-styrene-butylene-styrene block copolymers (SSBS) and/or at least one polyolefin selected from the group consisting of: polyethylene, polypropylene, polybutadiene, poly-4-methylpentene, ethylene-propylene copolymers, ethylene-butene copolymers, ethylene-methylhexadiene copolymers, propylene-methylhexadiene copolymers, ethylene-octene copolymers, ethylene-propylene-butene copolymers, Ethylene-propylene-hexenecopolymers, ethylene-propylene-methylhexadienecopolymers, poly(ethylene-vinyl acetate) (EVA), ethylene-ethyl acrylate copolymer (EEA), ethylene-hexene copolymer, ethylene-propylene-diene terpolymers, especially preferably grafted with acrylic acid, methacrylic acid or maleic anhydride, the degree of grafting being 0.1 to 4.0 percent by weight based on the grafted polymer (E);
(F) 0-10 percent by weight fillers and/or reinforcing materials;
(G) 5-35% by weight plasticiser;
(H) 0.1-4.0 percent by weight additives other than (E), (F) and (G);
the sum of (E)-(H) being 100 percent by weight of the thermoplastic moulding compound FM-2.

The present invention also relates to the use of the thermoplastic moulding compounds FM-1 and FM-2, as described above, for producing such a composite. The composite according to the invention can be produced by injection moulding or extrusion.

The method according to the invention for producing the composites explained above is preferably based on injection moulding and comprises the following stages:
(i) insertion of a moulded body, containing at least a section (I), formed from the moulding compound FM-1, into an injection mould or injection of the thermoplastic moulding compound FM-1 into an injection mould for shaping at least one section (I)
and
(ii) injection of the thermoplastic moulding compound FM-2 for shaping at least one section (II),
whereby the melts of the moulding compounds FM-1 and FM-2 are introduced into the injection mould in parallel or successively without mixing or without substantial mixing, and wherein the sections (I) and (II) are in contact at least at one point.

In this case, the moulding compound FM-2 preferably forms flat sections (II) in the finished injection-moulded part, which are preferably, on the narrow side surfaces and/or partially on the top or bottom, particularly preferably only on the side surfaces, in contact with the sections (I) formed by the moulding compound FM-1.

In the context of the present description of the invention, the definition "without mixing or without substantial mixing" means that the thermoplastic moulding compounds FM-1 and FM-2 for the composite material enter the moulding tool in a quasi plug-like manner or in parallel flows.

In the process according to the invention, in step (i) the moulded body which comprises the sections (I) can be inserted into the injection mould as an independent preform produced at least partially from the moulding compound FM-1. According to an alternative embodiment, this moulded body is produced in the injection mould in step (i).

The composite can be produced in one injection moulding process, that is, step (i) and step (ii) in parallel. This approach is advantageous because of its effectiveness and simplicity. In the context of the invention, however, it is also possible and in many cases advantageous to inject the thermoplastic moulding compound FM-1 into the injection mould in a first step and, in a subsequent second step (step ii), to inject the second thermoplastic moulding compound FM-2.

In the single-step procedure, a single-step standard sandwich injection process or a single-step mono-sandwich process, which are known as such to a person skilled in the art, can advantageously be used.

In the context of the invention, however, a multi-channel sandwich injection moulding process can also be used in which the two melts of the moulding compounds FM-1 and FM-2 are injected into the injection mould from two separate hot runner systems.

In the mono-sandwich process, the thermoplastic moulding compound FM-2 for the soft layer is injected from a simple extruder into the main cylinder of an extruder, e.g. a pusher screw extruder, in front of the thermoplastic moulding compound FM-1 located therein for the hard layer, wherein the worm of the main cylinder is retracted. The materials arranged one behind the other in the main cylinder in terms of their arrangement and rheologically are then injected into the mould in a single injection moulding process, wherein the composite according to the invention is formed.

The moulded body with the sections (I) can be prefabricated separately from the moulding compound FM-1 or can be produced in situ, so to speak, in the same injection mould.

The insertion process, in which a separately prefabricated moulded body with the sections (I) or the sections (II) is inserted into the mould, is particularly suitable for the production of small batch numbers or of carriers of large dimensions.

If the part of the composite with the sections (I) is produced within the injection moulding process, the core-back moulding process is advantageously used. In this method, a tool is used in which one or more slides are pulled out of the tool after the injection moulding of the preform, i.e. the moulded body with the sections (I) based on the moulding compound FM-1, in order to create the cavity for the parts of the composite of moulding compound FM-2. The device is also referred to as a "multislide tool". Alternatively, it is also possible to manufacture the carrier in a turning tool.

In the composite according to the invention, excellent adhesion of the sections (II) to the sections (I) is achieved.

The present invention also relates to the use of polyethyleneimine or a copolymer or derivative thereof in a composite containing sections (I), formed from a moulding compound containing polyamide, and containing sections (II), formed from a moulding compound containing olefinic/vinyl aromatic polymers, for improving the adhesion strength between these sections (I) and (II). Here, too, the polyethyleneimine is preferably present in the polyamide moulding compound in a proportion in the range of 0.5-4.0 percent by weight, preferably in the range of 0.8-3.0 percent by weight in the moulding compound, based on the total weight of the polyamide moulding compound, and in the case of polyethyleneimine, it is preferably a branched polyethyleneimine which preferably has a ratio of primary to secondary amines in the range of 1:2-2:1, preferably in the range of 1.2:1-1:1.2 and/or a ratio of primary to tertiary amines in the range of 3:1-1:1, preferably in the range of 2:1-1.4:1 and/or a ratio of secondary to tertiary amines in the range of 3:1-1:1, preferably in the range of 2:1-1.2:1.

The polyethyleneimine is further preferably a branched polyethyleneimine with a number average molar mass $M_n$ in the range of 500-50,000 or 500-25,000 g/mol, preferably in the range of 600-2000 or 1000-2500 g/mol.

The polyethyleneimine can preferably have the other properties that have already been described above in connection with the thermoplastic polyamide moulding compound.

Preferred applications for the composite materials are: car ignition keys, function keys for car ignition keys, remote controls of all kinds, e.g. for televisions, cranes and overhead cranes, tool handles for various pliers and electric hand tools, housing seals for sealing against moisture and water, housings with flexible membrane or sealing lip, electrical switch with flexible membrane cover, electrical plug with waterproof sealing lip etc. Further embodiments are stated in the dependent claims.

BRIEF DESCRIPTION OF THE DRAWINGS

The drawings in FIGS. 1 and 2 show the composite test specimen used and the holder for the roller peeling test for measuring the peel force. They serve only for explanation and are not to be interpreted restrictively.

| List of reference signs for FIGS. 1 and 2 | | | |
|---|---|---|---|
| 1 | Composite test specimen | a | Side length of 2 |
| 2 | Frame, section (I) | b | Width of 2 |
| 3 | Opening in the frame | c | Side length of 3 |
| 4 | Tab, section (II) | d | Width of 3 |
| 5 | Sprue side of section (II) | e | Side length of 4 |
| 6 | Holder for roller peeling test | f | Width of 4 |
| 7 | Deflection roller | g | Thickness of 2 |
| 8 | Fixing rollers | h | Thickness of 4 |
| Z | Traction axis | | |

DESCRIPTION OF PREFERRED EMBODIMENTS

Figure 1:
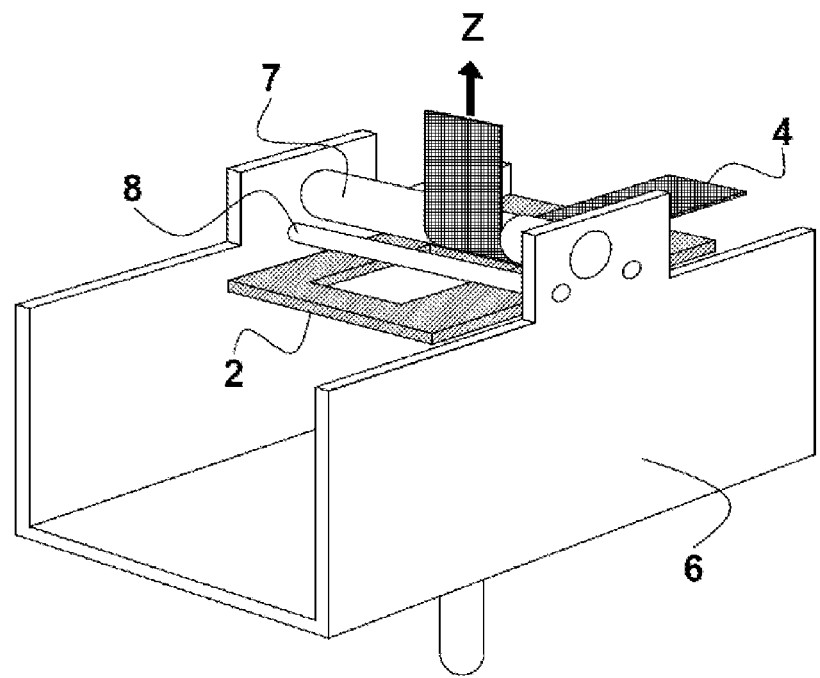

Production of the Polyamide Moulding Compounds FM-1

The components given in Table 1 were compounded in the proportions given in Table 2 in a twin-screw extruder from Werner and Pfleiderer with a screw diameter of 25 mm for given process parameters (see Table 3), the polyamide granules and the additives being metered into the feed zone while the glass fibre was dosed into the polymer melt via a side feeder 3 housing units in front of the nozzle. The compounds summarised in Table 2 were drawn off as a strand from a nozzle with a 3 mm diameter and granulated after cooling with water. The granulate was dried for 24 hours at 100° C. in a vacuum of 30 mbar.

TABLE 1

Materials used in the examples and comparative examples

| Components | Description | Manufacturer |
|---|---|---|
| Polyamide 1 (Component A1) | PA 66, $\eta_{rel.}$ = 1.85, Tm = 260° C. | EMS-CHEMIE AG |
| Polyamide 2 (Component A1) | PA 610, $\eta_{rel.}$ = 1.94, Tm = 195° C. | EMS-CHEMIE AG |
| Polyamide 3 (Component A4) | PA 6I/6T (67:33), $\eta_{rel.}$ = 1.52, $T_g$ = 125° C. | EMS-CHEMIE AG |
| Kraton G1651 E (Component E) | SEBS, styrene content = 31.5% by weight | Shell |
| Kraton FG1901GT (Component E) | SEBS-g-MAH, styrene content = 30% by weight, MAH content = 1.5% by weight | Shell |
| Polybond 3002 (Component E) | Polypropylene (PP-g-MAH), $T_m$ = 157° C., MAH content = 0.3% by weight | Additive |

TABLE 1-continued

Materials used in the examples and comparative examples

| Components | Description | Manufacturer |
|---|---|---|
| Polybond 3200 (Component E) | Polypropylene (PP-g-MAH), $T_m$ = 160° C., MAH content = 1.0% by weight | Additive |
| Admer QB 510E | Polypropylene (PP-g-MAH), MAH content = 0.05% by weight | Mitsui (JP) |
| Admer NF358E | LLDPE (PE-g-MAH), MAH content = 0.2% by weight | Mitsui (JP) |
| Glass fibre (Component C) | Vetrotex 995 EC10-4.5, E-glass, diameter = 10 μm, length = 4.5 mm, round cross-section | Owens Corning Fiberglass (US) |
| Soot (Component D) | Black Pearls 1100, Iodine absorption (g/kg): 20, OAN (cc/100 g): 105 (ASTM D-2414) | Cabot Corp. (CH) |
| PEI (Component B) | Lupasol G20WFR, polyethyleneimine (CAS 25987-06-8), number average molar mass $M_n$ = 1200 g/mol, water content at most 2 percent by weight, ratio of primary/secondary/tertiary amines 1:0.91:0.64 | BASF SE (DE) |
| Stabilisation (Component D) | Irganox 1010 (CAS 6683-19-8) | BASF SE |
| Plasticiser (Component G) | MERKUR WOP 240 PB Paraffin oil (Paraffinum Perliquidum) (CAS 8002-74-2) | Sasol (DE) |

$\eta_{rel}$ Relative viscosity determined according to ISO 306, 0.5 g polymer granulate in 100 ml m-cresol, 20° C., for polyamides 1 to 5
MAH Maleic anhydride
$T_g$, $T_m$ Glass transition temperature, melting temperature determined according to ISO 11357 with a heating rate of 20° C./min

TABLE 2

Moulding compounds FM-1 (B1, B2 and VB1 to VB5) as well as adhesion strength to moulding compounds FM-2 (I) to (III)

| Components | Unit | B1 | B2 | VB1 | VB2 | VB3 | VB4 | VB5 |
|---|---|---|---|---|---|---|---|---|
| Polyamide 1 (Component A1) | % by weight | 43.9 | | 30.7 | 20.6 | 40.1 | 44.6 | |
| Polyamide 2 (Component A1) | % by weight | | 68.0 | | | | | 69.5 |
| Polyamide 3 (Component A4) | % by weight | 14.6 | | 10.2 | 6.9 | 13.4 | 14.9 | |
| Stabiliser | % by weight | 0.3 | 0.3 | 0.3 | 0.3 | 0.3 | 0.3 | 0.3 |
| Soot | % by weight | 0.2 | 0.2 | 0.2 | 0.2 | 0.2 | 0.2 | 0.2 |
| Polybond 3002 | % by weight | | | 18.6 | | | | |
| Admer QB 510E | % by weight | | | | 32.0 | | | |
| Admer NF358E | % by weight | | | | | | 6.0 | |
| Glass fibre | % by weight | 40.0 | 30.0 | 40.0 | 40.0 | 40.0 | 40.0 | 30.0 |
| PEI | % by weight | 1.0 | 1.5 | | | | | |
| Characteristics | | | | | | | | |
| Shore D | | 85 | 82 | 80 | 80 | 82 | 84 | 82 |
| Modulus of elasticity | MPa | 16,100 | 9,100 | 10,200 | 10,100 | 12,000 | 16,400 | 9,200 |
| Breaking stress | MPa | 225 | 154 | 147 | 83 | 189 | 228 | 155 |
| Elongation at break | % | 2.0 | 3.9 | 2.1 | 1.5 | 3.0 | 2.0 | 4.0 |
| Impact strength, Charpy, 23° C. | kJ/m² | 66 | 88 | 41 | 22 | 87 | 72 | 90 |
| Notched impact strength, Charpy, 23° C. | kJ/m² | 14 | 16 | 10 | 9 | 16 | 15 | 18 |
| Adhesione strength to moulding compound FM-2 (I) | | | | | | | | |
| 0 d (48 h, 23° C.) | N | 122 | 127 | 28.1 | 19.9 | 24.2 | 108 | 111 |
| 2 d, 70° C., 62% RH | N | 125 | 125 | 26.6 | 19.6 | 17.5 | 20.4 | 22.7 |
| 5 d, 70° C., 62% RH | N | 117 | 122 | 21.1 | 19.1 | 11.2 | 16.2 | 15.1 |

TABLE 2-continued

Moulding compounds FM-1 (B1, B2 and VB1 to VB5) as well as adhesion strength to moulding compounds FM-2 (I) to (III)

| Components | Unit | B1 | B2 | VB1 | VB2 | VB3 | VB4 | VB5 |
|---|---|---|---|---|---|---|---|---|
| Adhesion strength to moulding compound FM-2 (II) | | | | | | | | |
| 0 d (48 h, 23° C.) | N | 177 | | | | | 70.6 | |
| 2 d, 70° C., 62% RH | N | 170 | | | | | 45.6 | |
| 5 d, 70° C., 62% RH | N | 157 | | | | | 38.8 | |
| Adhesion strength to moulding compound FM-2 (III) | | | | | | | | |
| 0 d (48 h, 23° C.) | N | 0 | | | | | | |

TABLE 3

Process parameter for compounding

| Parameter | Temperature profile [° C.] |
|---|---|
| Temperature zone 1 | 80-100 |
| Temperature zone 2 | 230-250 |
| Temperature zone 3 to 10 | 250-260 |
| Temperature zone 11 | 250-270 |
| Temperature zone 12 | 230-270 |
| Temperature of the nozzle head | 260-280 |
| Melt temperature | 250-280 |
| Throughput [kg/h] | 10-12 |
| Screw speed [rpm] | 150-200 |

To determine the mechanical properties, the compounds were injected into test specimens with an Arburg Allrounder 320-210-750 injection moulding machine at defined cylinder temperatures in zones 1 to 4 of 240 to 280° C. and a mould temperature of 100° C.

Production of the Moulding Compound FM-2

Composition (1): 42.7% by weight Kraton G1651 (SEBS)
24.0% by weight Polybond 3200 (PP-g-MAH)
33.0% by weight plasticiser (Paraffinum Perliquidum)
0.3% by weight Irganox HP2921

Composition (II): 99.7% by weight Kraton FG1901 GT (SEBS-g-MAH)
0.3% by weight Irganox HP2921

Composition (III): 42.7% by weight Kraton G1651 (SEBS)
23.0% by weight Polybond 3200 (PP-g-MAH)
33.0% by weight plasticiser (Paraffinum Perliquidum)
1.0% by weight Lupasol G20
0.3% by weight Irganox HP2921

The components were compounded in the specified proportions in a twin-screw extruder from Werner and Pfleiderer with a screw diameter of 25 mm at an average zone temperature of 200 to 230° C., a screw speed of 250 rpm and a throughput of 8 kg/h, wherein the SEBS, the PP and the additives were metered into the feed zone, while the plasticiser was metered into the polymer melt via a metering pump through a bore in the cylinder at the level of heating zone 3. The polymer melt was drawn off as a strand from a nozzle with a 3 mm diameter and granulated after cooling with water. The granules were dried for 24 hours at 80° C. in a vacuum of 30 mbar. The test specimens produced with this granulate had a Shore hardness of 80A for the moulding compound FM-2 (I), a Shore hardness of 70 A for the moulding compound FM-2 (II) and a Shore hardness for the moulding compound FM-2 (III) of 78 A.

Production of the Composite Test Specimen

The composite test pieces, so-called 2K peel plates made of frames and tabs, were manufactured using an Arburg Allrounder 520A injection moulding machine, equipped with a 30 mm standard three-zone screw. For this purpose, in a first step (i), the frame plate (section (1)) was injection moulded from the moulding compound FM-1 (i.e. the polyamide moulding compounds B1, B2 and VB1 to VB5). 25 seconds after the start of the injection of the frame plate, the slide that kept the cavity for the section (II) occupied during phase (i) was pulled out of the tool. In the second step (ii), the moulding compound FM-2 was then injected into this now vacated cavity and the flexible tab (section (11)) was formed in this way. The injection moulding parameters used are summarised in the table below. The composite test specimen 1 can be seen in FIGS. 1 and 2. The frame has a side length a of 120 mm, a width b of 90 mm and a thickness g of 3 mm, while the tab 4 has a side length e of 150 mm, a width f of 30 mm and a thickness h of 1 mm. The frame 2 contains an opening 3 with a side length c of 55 mm and a width d of 50 mm, which is positioned in the frame 2 such that the overlap of the frame 2 with the tab 4 takes up an area of 50×30 mm². The side of the tab 4 remote from the sprue is located above the frame opening 3.

| Parameter | Unit | Moulding compound FM-1 | Moulding compound FM-2 |
|---|---|---|---|
| Temperature of cylinder Zones 0, 1, 2, 3, 4 | ° C. | 40, 260, 270, 280, 290 | 40, 180, 190, 200, 210 |
| Temperature of nozzle | ° C. | 290 | 210 |
| Temperature of hot runner | ° C. | 290 | 290 |
| Temperature of tool | ° C. | 100 | 100 |
| Injection speed | mm/s | 100 | 100 |
| Screw speed | RPM | 80 | 100 |
| Back pressure | bar | 100 | 100 |
| Holding pressure | bar | 200 | 300 |

Measuring Methods

Unless otherwise specified, the test specimens were used in the dry state. For this purpose, the test specimens were stored after injection moulding for at least 48 hours at room temperature in a dry environment, i.e. over silica gel.

The following measurement methods were used for this application:

Melting Point (Tm) and Enthalpy of Fusion (ΔHm):

The melting point and enthalpy of fusion were determined on the granulate according to ISO 11357-3 (2013). The DSC (differential scanning calorimetry) measurements were carried out with a heating rate of 20 K/min.

Glass Transition Temperature, Tg:

The glass transition temperature $T_g$ was determined in accordance with ISO 11357-2 (2013) on granules by means of differential scanning calorimetry (DSC). This was carried out for each of the two heatings at a heating rate of 20 K/min. After the first heating, the sample was quenched in dry ice. The glass transition temperature ($T_g$) was determined during the second heating. The midpoint of the glass transition area, which was given as the glass transition temperature, was determined by the "Half Height" method.

Relative Viscosity, $\eta_{rel}$:

The relative viscosity was determined according to ISO 307 (2007) at 20° C. For this purpose, 0.5 g of polymer granules were weighed into 100 ml of m-cresol (unless otherwise stated), and the calculation of the relative viscosity (RV) according to $RV=t/t_0$ was based on Section 11 of the standard.

Tensile Modulus of Elasticity:

The tensile modulus of elasticity was determined according to ISO 527 (2012) at 23° C. with a tensile speed of 1 mm/min on an ISO tensile rod (type A1, dimensions 170×20/10×4) according to the standard: ISO/CD 3167 (2003).

Breaking Stress and Elongation at Break:

The determination of breaking stress and elongation at break were carried out according to ISO 527 (2012) at 23° C. with a tensile speed of 5 mm/min on an ISO tension rod, type A1 (dimensions 170×20/10×4 mm), produced according to the ISO standard/CD 3167 (2003).

Charpy Impact Strength:

The Charpy impact strength was determined in accordance with ISO179/2*eU (1997, *2=instrumented) at 23° C. on an ISO test rod, type B1 (dimensions 80×10×4 mm), produced in accordance with the ISO/CD 3167 (2003).

Charpy Notched Impact Strength:

The Charpy notched impact strength was determined in accordance with ISO 179/2*eA (1997, *2=instrumented) at 23° C. on an ISO test rod, type B1 (dimensions 80×10×4 mm), produced in accordance with the ISO/CD 3167 (2003).

Shore Hardness

The Shore hardness according to methods A and D was determined using a hardness tester from Karl Franknach according to ISO 7619-1 (2012-02). The arithmetic mean values from 5 measurements are given. The test specimens used had the dimensions 60×60×4 mm and were stored in a dry place at 23° C. until immediately before the test, but for at least 48 hours after production. The measurement was also carried out at 23° C. and the values read off after 15 seconds.

Figure 2:
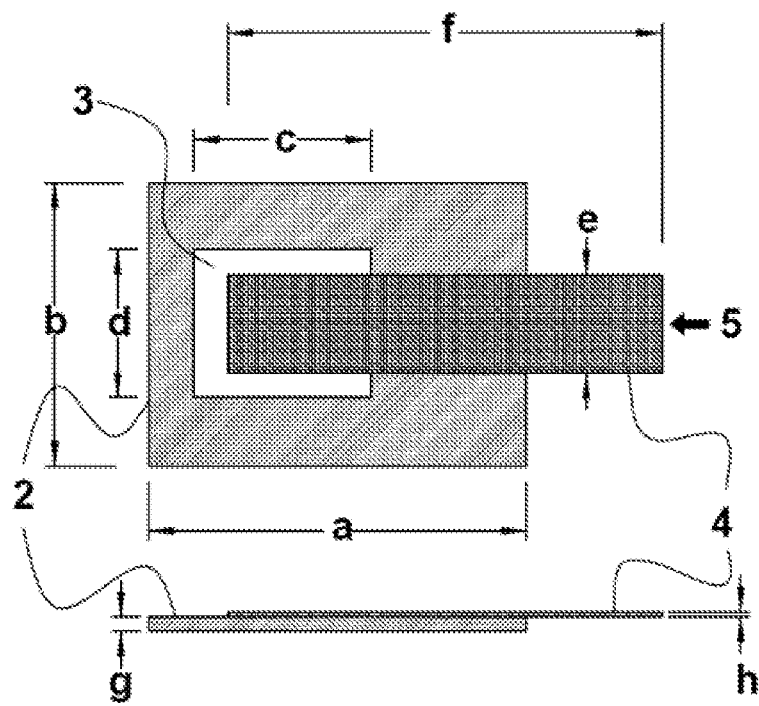

Adhesion Strength:

The composite test specimens (2K peel plate) according to FIGS. 1 and 2 for determining the adhesion strength were stored for different times at 70° C. and 62% relative humidity. The test specimens were stored overnight (12 hours) in an air-conditioned environment at 23° C./50% rel. humidity until the roller peel test. Storage for 0 hours means that the composite test specimens produced were stored for 48 hours at room temperature (23° C.) in a dry environment, i.e. over silica gel, after injection moulding. The terms used in the following in connection with the composite test specimen and the holder for the roller peel test refer to FIGS. 1 and 2.

The adhesion strength was determined by means of a roller peel test at 23° C., in which the 30 mm wide tab 4 (section II) of the composite test specimen 1 used for the measurement was moved over a deflection roller 7 at an angle of 90° using a tensile testing machine peeled from frame 2 (section I) at a tensile speed of 50 mm/min; Table 2 shows the mean value of the mean peel force [N] determined from five individual measurements over the measuring section. The part of the tab remote from the sprue was attached to the upper specimen holder and the holder 6 for the test specimen was attached to the lower specimen holder of the tensile testing machine. The deflection roller 7 used had a diameter of 20 mm. The frame 2 of the composite test body can move freely in the plane perpendicular to the tensile axis Z and is stabilised by means of fixing rollers 8. During the peeling test, the frame 2 was shifted continuously over the entire measuring section in the holder so that the break zone (zone between still adhering and already loosened parts) was always in the plane of the tensile axis Z.

Discussion of the Results:

The composite according to the invention with a section (I) made of the polyamide moulding compound B1 and a section (II) made of the moulding compound FM-2 (I) has very good adhesion strength and retains this good adhesion even after five days of storage at 70° C. and 62% relative humidity at almost the same level. In comparison, the adhesion strength of VB4, which, in contrast to B1, is free of component (B), to FM-2 (I) is already 10% lower after manufacture and insufficient after storage. The same picture emerges in a comparison of the composites B2/FM-2 (I) and VB5/FM-2 (I), wherein excellent adhesion can be measured for B2 after production and storage, while there is insufficient adhesion after storage for VB5. Looking now at the adhesion strength to the moulding compound FM-2 (II), the moulding compound B1 according to the invention has excellent adhesion before and after storage, while the adhesion of VB4 is already reduced by a factor of 2.5 after production compared to B1 and turns out to be insufficient after storage. The modification of the polyamide moulding compound with MAH-grafted polyolefins according to the prior art, as represented by the comparative examples VB1 to VB3, does not lead to composites with adequate adhesion. No or only very weak adhesion strength was observed when component (B) was contained in both moulding compounds or in sections (I) and (II) of the composite at the same time.

The invention claimed is:

1. A composite containing directly adjoining and firmly bonded sections (I) and (II) of the following type:
   (I) section, formed from a thermoplastic moulding compound FM-1 containing at least one polyamide (A) and optionally fillers and reinforcing materials (C) and additives (D);
   (II) section, formed from a thermoplastic moulding compound FM-2 containing at least one olefinic and/or vinyl aromatic polymer (E) and optionally fillers and reinforcing agents (F), plasticisers (G) and additives (H);
   wherein the moulding compound FM-1 or FM-2 contains 0.1 to 5.0 percent by weight of polyethyleneimine homopolymer (B).

2. The composite according to claim 1, wherein the thermoplastic moulding compound FM-1 contains the following components:
   (A) 30-99.9 percent by weight of at least one polyamide;
   (B) 0.1-5.0 percent by weight polyethyleneimine homopolymer;
   (C) 0-60 percent by weight fillers and/or reinforcing materials;
   (D) 0-5.0 percent by weight additives other than (A)-(C);
   the sum of (A)-(D) being 100 percent by weight of the thermoplastic moulding compound FM-1, and in that the thermoplastic moulding compound FM-2 contains the following components:

(E) 45-100 percent by weight of at least one olefinic and/or vinyl aromatic polymer;
(F) 0-15 percent by weight fillers and/or reinforcing materials;
(G) 0-35% by weight plasticiser;
(H) 0-5.0% by weight additives other than (E), (F) and (G);
the sum of (E)-(H) being 100 percent by weight of the thermoplastic moulding compound FM-2.

3. The composite according to claim 1, wherein the at least one polyamide (A) is present in a proportion of at most 31-79.5 percent by weight, based on the total weight of the moulding compound FM-1;
and/or
the at least one olefinic and/or vinyl aromatic polymer (E) is present in a proportion of at most 55-94.9 percent by weight, based on the total weight of the moulding compound FM-2.

4. The composite according to claim 1, wherein the thermoplastic moulding compound FM-1 contains the following components:
(A) 35-100 percent by weight of at least one polyamide;
(C) 0-60 percent by weight fillers and/or reinforcing materials;
(D) 0-5.0% by weight additives other than (A) and (C);
the sum of (A), (C) and (D) being 100 percent by weight of the thermoplastic polyamide moulding compound FM-1,
and in that the thermoplastic moulding compound FM-2 contains the following components:
(E) 40-99.9 percent by weight of at least one olefinic and/or vinyl aromatic polymer;
(B) 0.1-5.0 percent by weight polyethyleneimine
(F) 0-15 percent by weight fillers and/or reinforcing materials;
(G) 0-35% by weight plasticiser;
(H) 0-5.0 percent by weight additives other than (E), (F), (G) and (B);
the sum of (B) and (E)-(H) being 100 percent by weight of the thermoplastic moulding compound FM-2.

5. The composite according to claim 4, wherein, the at least one polyamide (A) is present in a proportion of at most 35-80 percent by weight, based on the total weight of the moulding compound FM-1;
and/or
the at least one olefinic and/or vinyl aromatic polymer (E) is present in a proportion of at most 51-94.4 percent by weight, based on the total weight of the moulding compound FM-2.

6. The composite according to claim 1, wherein the polyethyleneimine homopolymer (B) is present in a proportion of 0.5-4.0 percent by weight, based on the total weight of the moulding compound FM-1 or FM-2.

7. The composite according to claim 1, wherein the at least one polyamide (A) of the moulding compound FM-1 is selected as partially crystalline, acyclic, aliphatic polyamides (A1) from the group consisting of: 46, 56, 66, 66/6, 69, 610, 612, 614, 616, 618, 810, 1010, 1012, 1014, 1016, 1212, 11, 12, 6/12, 66/6/610;
and/or
partially crystalline, partially aromatic polyamides (A2) from the group consisting of: 6T/6I, 6T/66, 6T/6I/66, 6T/610, 6T/612, 6T/614, 6T/616, 9T, 9MT, 10T, 12T, 10T/6T, 11/10T, 12/10T, 11/9T, 12/9T, 10T/1010, 10T/612;
and/or
cycloaliphatic polyamides (A3) from the group consisting of: MACM12/PACM12, MACM14/PACM14, MACM16/PACM16, MACM18/PACM18, 6I/6T/MACMI/MACMT/12, 6I/MACMI/MACMT, 6I/PACMI/PACMT, 6I/6T/MACMI, 6I/6T/612/MACMI/MACMT/MACM12, MACMI/MACMT/12, 6/IPDT, 6I/6T/614/MACMI/MACMT/MACM14, 6I/6T/616/MACMI/MACMT/MACM16, MACMI/MACM36, 12/PACMI, 12/MACMT, 6I/PACMT, MACM10, MACM12, MACM14, MACM16, MACM18, MACMI/12, PACM10, PACM12, MACM14, PACM16, PACM18, PACMI/12, TMDC10, TMDC12, TMDC16, TMDC18, MACMT/MACMI/12, PACMT/PACMI/12;
and/or
amorphous, partially aromatic polyamides (A4) from the group consisting of: 5I, 6I, 6/6I, MXDI, MXDI/6I, MXD6/MXDI, 5T/5I, 6T/6I, 10T/10I, 3-6T (3-6=2,2,4- or 2,4,4-trimethylhexanediamine) or mixtures thereof, or systems 5T/5I, 6T/6I or 10T/10I having a proportion of less than 50 mol % 5T, 6T or 10T units, and a composition range 5T:5I, 6T:6I or 10T:10I from 20:80 to 45:55, in each case stated as mol %.

8. The composite according to claim 1, wherein the at least one polyamide (A) of the moulding compound FM-1 contains the following components or consists of the following components:
20-100 percent by weight of at least one partially crystalline, acyclic, aliphatic polyamide (A1) and/or at least one partially aromatic, partially crystalline polyamide (A2),
0-80 percent by weight of at least one cycloaliphatic polyamide (A3) and/or an amorphous, partially aromatic polyamide (A4),
the percent by weight of components (A1) to (A4) adding up to 100 percent by weight of component (A);
or
20-80 percent by weight of at least one partially crystalline, acyclic, aliphatic polyamide (A1) selected from the group consisting of PA66, PA610, PA612, PA614 and PA616;
20-80 percent by weight of at least one amorphous, partially aromatic polyamide (A4) selected from the group consisting of 5T/5I, 6T/6I and 10T/10I,
the percent by weight of components (A1) and (A4) adding up to 100 percent by weight of component (A).

9. The composite according to claim 1, wherein the moulding compound FM-2 contains as component (E) at least one vinyl aromatic polymer, being at least 50 percent by weight, a vinyl aromatic polymer and which optionally contains at least one polyolefin.

10. The composite according to claim 1, wherein the at least one olefinic and/or vinyl aromatic polymer (E) of the moulding compound FM-2 is selected from the group consisting of: styrene-ethylene-butylene-styrene block copolymers (SEBS), styrene-ethylene-propylene-styrene block copolymers (SEPS), styrene-butylene-styrene block copolymers (SBS), styrene-styrene-butylene-styrene block copolymers (SSBS), polyethylene (PE), polypropylene (PP), polybutadiene (PB), poly-4-methylpentene, ethylene-propylene copolymers, ethylene-butene copolymers, ethylene-methylhexadiene copolymers, propylene-methylhexadiene copolymers, ethylene-octene copolymers, ethylene-propylene-butene copolymers, ethylene-propylene-hexene copolymers, ethylene-propylene-methylhexadiene copolymers, poly(ethylene-vinyl acetate) (EVA), ethylene-ethyl acrylate copolymer (EEA), ethylene-hexene copolymer, ethylene-propylene-diene terpolymers and mixtures of these polymer materials.

11. The composite according to claim 1, wherein the at least one olefinic and/or vinyl aromatic polymer (E) of the moulding compound FM-2 is grafted with carboxylic acid or carboxylic anhydride groups;
and/or
the at least one olefinic and/or vinyl aromatic polymer (E) is grafted with acrylic acid, methacrylic acid or maleic anhydride;
and/or p1 the degree of grafting is 0.1 to 4.0 percent by weight, based on the grafted polymer (E).

12. The composite according claim 1, wherein the polyethyleneimine homopolymer of component (B) is a branched polyethyleneimine homopolymer, which has a ratio of primary to secondary amines in the range of 1:2-2:1, and/or a ratio of primary to tertiary amines in the range of 3:1-1:1, and/or a ratio of secondary to tertiary amines in the range of 3:1-1:1;
and/or
in that the polyethyleneimine homopolymer of component (B) is a branched polyethyleneimine homopolymer with a number average molar mass Mn in the range of 500-50,000 g/mol,
and/or in that the polyethyleneimine homopolymer of component (B) is a branched polyethyleneimine homopolymer with a content of primary amino groups in the range of 5000-20,000 µeq/g;
and/or
in that the polyethyleneimine homopolymer of component (B) is a branched polyethyleneimine homopolymer with a water content of less than 4 percent by weight.

13. The composite according to claim 1, wherein the moulding compound FM-1 contains the fillers and reinforcing materials of the component (C) in a proportion in the range of 20-60 percent by weight;
and/or
the moulding compound FM-2, which contains the fillers and reinforcing materials of component (F) in a proportion in the range of 0-10 percent by weight; and/or
that components (C) and (F) consist of:
particulate filler (C1) and (F1selected from the group consisting of: soot, talc, mica, silicates, quartz, wollastonite, kaolin, silicic acids, magnesium carbonate, magnesium hydroxide, chalk, ground or precipitated calcium carbonate, lime, feldspar, inorganic pigments, including barium sulphate, zinc oxide, zinc sulphide, lithopone, titanium dioxide (rutile, anatase), iron oxide, iron manganese oxide, metal oxides, especially spinels, including copper iron spinel, copper chromium oxide, zinc-iron oxide, cobalt-chromium oxide, cobalt-aluminium oxide, magnesium aluminium oxide, copper-chromium-manganese mixed oxides, copper-manganese-iron mixed oxides, rutile pigments including titanium zinc rutile, nickel antimony titanate, chromium antimony titanate, hard or soft magnetic metals or alloys or ceramics, hollow spherical silicate fillers, aluminium oxide, boron nitride, boron carbide, aluminium nitride, calcium fluoride and mixtures thereof;
and/or
fibrous reinforcing material (C2) and (F2) selected from the group consisting of: glass fibres, carbon fibres, graphite fibres, aramid fibres, nanotubes or mixtures thereof, wherein the fibres of components (C2) and (F2) can have circular or non-circular cross-sectional areas.

14. The composite according to claim 1, wherein the additives of component (D) are present in the moulding compound FM-1 in a proportion in the range of 0.1-4.0 percent by weight;
and/or
the additives of component (H) are present in the moulding compound FM-2 in a proportion in the range of 0.1-4.0 percent by weight;
and/or
the additives of components (D) and (H) are selected from the group consisting of: stabilisers, aging inhibitors, antioxidants, antiozonants, light stabilisers, UV stabilisers, UV absorbers, UV blockers, inorganic heat stabilisers, in particular based on copper halides and alkali halides, organic heat stabilisers, conductivity additives, optical brighteners, processing aids, nucleating agents, crystallisation accelerators, crystallisation retarders, flow additives, lubricants, mould release agents, organic pigments and dyes, markers and mixtures thereof.

15. The composite according to claim 1, wherein the plasticiser of component (G) is present in the moulding compound FM-2 in a proportion in the range of 5-35 percent by weight,
and/or
the plasticiser of component (G) is selected from the group consisting of paraffinic and naphthenic oils.

16. The composite according to claim 1, wherein the section (I), formed from the thermoplastic moulding compound FM-1, has a Shore hardness of at least 70D determined according to ISO 7619-1 (2012-02) in the dry state
and/or
the section (II), formed from the thermoplastic moulding compound FM-2, has a Shore hardness of at most 60 determined according to ISO 7619-1 (2012-02) in the dry state.

17. Use of polyethyleneimine homopolymer in a composite containing sections (I), formed from a moulding compound FM-1 containing polyamide, and containing sections (II), formed from a moulding compound FM-2 containing olefinic and/or vinyl aromatic polymer, for improving the adhesion strength between the sections (I) and (II).

* * * * *